June 21, 1960          C. SAGONA          2,941,522
INTERNAL COMBUSTION ENGINES
Filed April 30, 1958
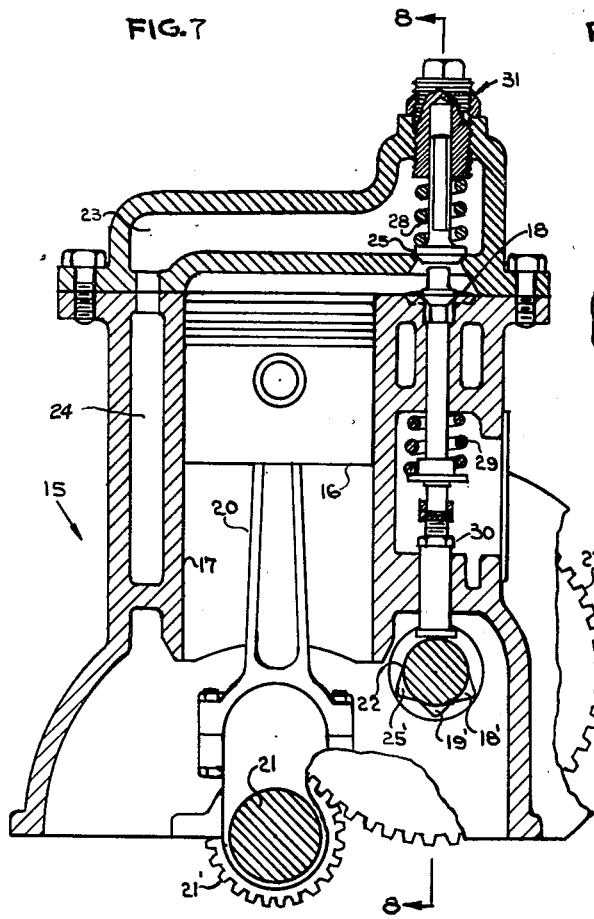
FIG. 7
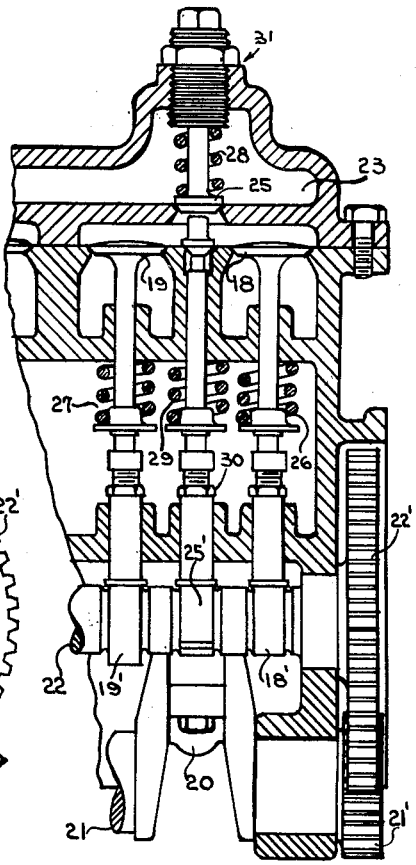
FIG. 8
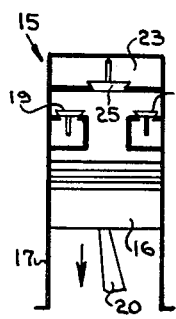  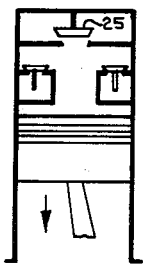 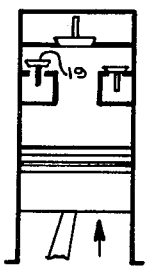 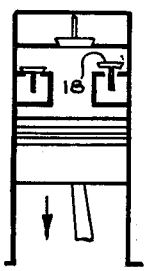 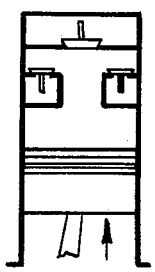
FIG. 1     FIG. 2     FIG. 3     FIG. 4     FIG. 5     FIG. 6
INVENTOR,
CHARLES SAGONA,
BY
ATTORNEY.

United States Patent Office 2,941,522
Patented June 21, 1960

2,941,522
INTERNAL COMBUSTION ENGINES

Charles Sagona, 73 Bay 34th St., Brooklyn, N.Y.

Filed Apr. 30, 1958, Ser. No. 732,094

8 Claims. (Cl. 123—64)

The present invention relates to improvements in internal combustion engines.

An object of this invention is to provide a novel and improved engine affording more power than is at present possible with one operating on a four-stroke cycle using the same amount of fuel per cycle of operation.

Another object thereof is to provide a novel and improved engine utilizing power wasted in engines operating on a four-stroke cycle.

A further object thereof is to provide a novel and improved engine, eliminating various appurtenances commonly part of and used in connection with four-stroke cycle engines, and affording use of the cheaper low octane fuels to operate same.

Still another object of this invention is to provide a novel and improved internal combustion engine construction having a new mode of operation, the structure being simple, reasonable in cost and efficient in carrying out the purposes for which it is designed.

Other objects and advantages will become apparent as this disclosure proceeds.

For the practice of this invention, one form it may assume, is to utilize an ordinary four-stroke cycle engine structure and provide it with an auxiliary chamber for the conditioning of the gases of combustion, and valve means to make said chamber communicative with the cylinder after the power stroke occasioned by explosion and at possible other times as will be explained, so as to utilize residual power heretofore wasted and thus gain a "bonus" power stroke per cycle of operation. This new engine operates on a six-stroke cycle and of course, the speeds of the crank shaft and the cam shaft are in the ratio of three to one. The two additional strokes occur between the power and exhaust strokes of the four-stroke cycle.

In practice, multi-cylinder engines are contemplated for efficiency, and engines may be built utilizing the principles of this invention to attain more than one "bonus" power stroke, in which event the number of strokes per cycle would be increased by multiples of two, and the mentioned ratio of shaft speeds would equal half the total strokes per cycle to one. In any event, the additional strokes occur between the power and exhaust strokes of the four-stroke cycle.

In the accompanying drawings forming part of this specification, similar characters of reference indicate corresponding parts in all the views.

Figs. 1 through 6 are diagrammatic representations of an internal combustion engine embodying the teachings of this invention, and they particularly show successively the six strokes per cycle of operation.

Fig. 7 is an elevational section of the engine.

Fig. 8 is a segmentary section taken at lines 8—8 in Fig. 7.

In the drawings, the numeral 15 designates generally an internal combustion engine having the piston 16 slidably fitted in the cylinder 17 equipped with an intake valve 18 and an exhaust valve 19. The piston's connecting rod 20 is associated as usual with the crank shaft 21 and the said valves are controlled by suitable cams 18' and 19' on the cam shaft 22. These shafts carry the meshed gears 21' and 22' respectively, which are in such ratio that for each revolution of the cam shaft 22, the crank shaft will revolve three times.

The auxiliary chamber 23, for convenience, may be at the head of the cylinder, or the greater part of such chamber may be a jacket about the cylinder as indicated at 24, or both as in the embodiment shown. This auxiliary chamber must be so associated with the cylinder body so that heat generated in the cylinder 17 shall be used for heating the auxiliary chamber 23. Said chamber is controlled by a spring-loaded normally closed valve 25, which when opened, will make said chamber communicative with the cylinder 17. The valve 25 will open when the pressure in the cylinder 17 reaches a certain amount, or when physically shifted by the operating member 30 therefor which is controlled by the cam 25' on the cam shaft 22. The compression springs 26, 27 and 28 bias the valves 18, 19 and 25 to closed condition respectively, and the compression spring 29 biases the member 30 away from the valve 25. The numeral 31 indicates any suitable means to adjust the spring strength of 28 so that only certain pressures within the cylinder could operate said valve to open.

No cooling system is used in this engine, except as hereinafter mentioned, since we need utilize the heat generated by the explosion of the fuel. Hence the usual radiator, water pump and fan are dispensed with. Also, this engine can operate without separately-operating ignition means, hence the usual spark plugs, distributor and electrical power apparatus for ignition is dispensed with. High compression of the cheaper fuels with low octane ratings are preferable for this engine so that ignition is attained by the heat of compression. Of course, suitable starting means well known in the art is provided, and if desired, electrical ignition may be used. Should it be found that excessive heat is generated, then some cooling means should be included.

As mentioned, the engine shown, operates on a six-stroke cycle; the strokes being indicated successively in the Figs. 1–6.

Fig. 1 shows the first stroke in the cycle. It is the power down stroke. At the commencement of this stroke, all valves are closed, but at the height of the explosion, some of the burnt gases will enter the auxiliary chamber 23 because the valve 25 will be caused to open due to the very high pressure existing in the cylinder at the time of the explosion. The engine body and the chamber 23 are heated up by the heat of the explosion and such heat acts to expand the burnt gases within such chamber thereby increasing the pressure of such gases.

Fig. 2 shows the second stroke which is a compression and pumping stroke, namely an up stroke. On this up stroke, the pressure built up in the cylinder will keep the valve 25 open and some of the hot burnt gases will be forced into the auxiliary chamber 23. The valves 18 and 19 remain closed. Upon build up of the pressure in the chamber 23 due to the gases forced therein, the valve 25 will close.

Fig. 3 shows the third stroke which is a down stroke and valve 25 is opened by action of the cam 25', causing the gases from within the chamber 23, at high pressure due to the pumping stroke of Fig. 2 and the further expansion of such cached gases due to the heat of the chamber 23 imparted thereto by the heat of the explosion and augmented by the heat of the engine body, to give a "bonus" power stroke. That is, such is a second power stroke in the cycle of operation, occuring without the expenditure of any additional fuel.

Figs. 4, 5 and 6, which indicate the fourth, fifth and last, the sixth strokes of this engine, are the same as the last three strokes of an engine operating on a four-stroke cycle. That is, Fig. 4 shows the upward exhaust stroke, where only valve 19 is open. Fig. 5 shows the downward intake stroke, where only the valve 18 is open and Fig. 6 shows the upward compression stroke, where all the valves are closed.

The respective positions of the cams 18', 19' and 25' are so arranged on the cam shaft 22, to effect operation of their associated valves in the timed relation in each cycle of operation as explained.

In starting the engine, it is worked without load until it heats up to get an effective "bonus" power stroke of Fig. 3. Until that time, momentum is relied on to give the extra turn to the crankshaft 21; the engine having a proper fly wheel not shown.

For an eight-stroke cycle engine, the gears 22', 21' are in the ratio of four to one and identical strokes in succession as shown in Figs. 2 and 3 are repeated between the strokes shown in Figs. 3 and 4. For a greater even-number stroke cycle engine, said gear ratio is made half the total number of strokes in the cycle and the extra set of strokes are as shown in Figs. 2 and 3 in succession occuring prior to the stroke shown in Fig. 4 which is the exhaust stroke. For the six-stroke cycle engine, the strokes shown in Figs. 2 and 3, occur once per cycle. In the eight-stroke per cycle engine, said set of strokes of Figs. 2 and 3, will occur twice in succession. In the ten-stroke cycle engine, said strokes of Figs. 2 and 3 will occur thrice in succession. In all constructions, the cams 18', 19' are arranged on the crankshaft 22 in proper position to effect the conditions shown in Figs. 4 and 5 in proper timed relation in the cycle of operation. The cam 25' will be a one-two or three toothed cam in the six, eight and ten stroke cycle engines respectively, with such teeth suitably spaced to effect opening of the valve 25 during each stroke as shown in Fig. 3.

This invention as is evident to those versed in this art, is also applicable to the Deisel engine which is an engine operating on the usual four stroke cycle, and it is intended that the following claims shall cover such adaptation. In the Deisel engine, the supply of air taken into the cylinder to be compressed, must be deemed part of the fuel, for without it, the engine would not operate. Hence, as regards the following claims, the air intake valve of such an engine, shall be deemed within the meaning and scope of the term "fuel intake valve means" as included in the appended claims.

This invention is capable of numerous forms and various applications without departing from the essential features herein disclosed. It is therefore intended and desired that the embodiment shown herein shall be deemed illustrative and not restrictive and that the patent shall cover all patentable novelty herein set forth; reference being had to the following claims rather than to the specific description herein to indicate the scope of this invention.

I claim:
1. In an internal combustion engine operating on a cycle including one or more sets of two strokes each in addition to the strokes of a four stroke cycle, such sets of strokes occuring in succession between the power and exhaust strokes of the four stroke cycle strokes, the combination of a cylinder, a piston operating in said cylinder, an auxiliary chamber adapted for communication with said cylinder, a fuel intake valve means, an exhaust valve means and an auxiliary valve means; all of said valve means being normally closed and when open, afford communication with one end of said cylinder; said auxiliary valve means when open, making said cylinder and chamber communicative, means holding said auxiliary valve means in closed condition; said holding means being made ineffective by action of and during continuance of the pressure produced in the cylinder by the power stroke of the four stroke cycle strokes when such pressure has attained a predetermined force whereby said auxiliary valve means is caused to be open while its mentioned holding means is made ineffective and valve-operating means operating the auxiliary valve means to open during the second stroke of each of said sets of two strokes each set; said valve-operating means also operating the exhaust valve means to open during the first stroke occuring after said sets of strokes are completed and the intake valve means to open during the second stroke occuring after said sets of strokes are completed.

2. An engine as defined in claim 1, wherein the means holding the auxiliary valve means closed, consists of a spring biasing the auxiliary valve means to closed position.

3. An engine as defined in claim 2, including means associated with said spring for adjusting the initial stress in said spring.

4. An engine as defined in claim 1, including a crank shaft, and a cam shaft having cams; said cams serving as the valve-operating means mentioned and a connecting rod associated with the piston and the crank shaft whereby such crank shaft will turn upon movement of the piston within the cylinder and means associating said shafts for simultaneous rotation so that the ratio of the speed of the crank shaft measured in revolutions per unit of time to that of the cam shaft similarly measured, is one-half the total number of strokes per cycle of operation of the engine.

5. An engine as defined in claim 1, wherein the cylinder and the auxiliary chamber have a common wall.

6. An engine as defined in claim 1, wherein the auxiliary chamber is next to the mentioned end of the cylinder.

7. An engine as defined in claim 1, wherein at least part of the auxiliary chamber is about the cylinder.

8. In an internal combustion engine having a cylinder and a piston operating in said cylinder, means for admitting a combustible mixture into the cylinder, means for storing under pressure a portion of the gases resulting from the combustion of said mixture, means to release the stored gases into the cylinder to move the piston after the piston has been moved by the other portion of said gases resulting from the combustion of said mixture, means for exhausting the products of combustion from the cylinder and means to actuate all the foregoing means in the sequence herein stated.

References Cited in the file of this patent
UNITED STATES PATENTS

| | | |
|---|---|---|
| 1,771,335 | Karpes | July 22, 1930 |
| 1,794,799 | Schwarz | Mar. 3, 1931 |
| 1,971,904 | Edgar | Aug. 28, 1938 |
| 2,209,706 | Rudd | July 30, 1940 |
| 2,249,997 | Wydler | July 22, 1941 |
| 2,269,945 | Landry | Jan. 13, 1942 |